3,567,750
Patented Mar. 2, 1971

3,567,750
REACTION PRODUCTS OF CERTAIN SILICON-CHLORINE-CONTAINING COMPOUNDS WITH THE REACTION PRODUCT OF A BORATE ESTER AND THE CHLORIDE OF CERTAIN METALS
Robert C. Wade, Ipswich, Mass., assignor to
Ventron Corporation, Beverly, Mass.
No Drawing. Continuation-in-part of application Ser. No. 786,447, Dec. 23, 1968, now Patent No. 3,515,738, which is a continuation-in-part of application Ser. No. 670,417, Sept. 25, 1967, which in turn is a division of application Ser. No. 670,419, Sept. 25, 1967, now Patent No. 3,455,976. This application Dec. 23, 1968, Ser. No. 786,448
Int. Cl. C07f 7/00, 9/00, 15/02
U.S. Cl. 260—429                                     20 Claims

ABSTRACT OF THE DISCLOSURE

The invention relates to products of unknown chemical structure prepared by reacting a borate ester such as trimethyl borate, triethyl borate, tripropyl borate, tributyl borate, trihexyl borate, trihexylene glycol biborate, tri-m,p-cresyl borate, and trimethoxylboroxine with a chloride of a metal selected from the group consisting of Ti(IV), Zr(IV), Hf(IV), Sn(IV), Al(III), Fe(III), Ga(III), In(III), Mo(V), Nb(V), Ta(V), and W(VI) in a molar ratio of at least 0.33 mole of the selected borate ester for each mole of the chloride of the selected metal in a substantially anhydrous diluent, such as an excess of the selected borate ester, methylene chloride, chloroform, and carbon tetrachloride, at a temperature between room temperature and about 200° C. until the reaction mixture ceases to give off organic chloride thereby forming a liquor comprising the diluent and a compound of complex chemical structure comprising the selected metal, boron, carbon, hydrogen, chlorine, and oxygen. Then there is added to said liquor a silicon-containing compound conforming to the formula $Cl_nSiR_{4-n}$ where $n$ is an integer from 1 to 4 and R is an alkyl or aryl radical in a molar quantity not greater than that of the chloride of the selected metal to react with said complex compound at a temperature between room temperature and about 200° C. thereby forming a second compound of complex chemical structure. The second compound of complex chemical structure may be isolated by removing volatile material from the reaction mixture by evaporation. Silicon tetrachloride, dimethyl-dichlorosilane, diphenyldichlorosilane and trimethylchlorosilane are illustrative of compounds conforming to the formula $Cl_nSiR_{4-n}$.

---

This application is a continuation-in-part of my copending application Ser. No. 786,447, filed Dec. 23, 1968 now Patent No. 3,515,738, which was a continuation-in-part of my copending application Ser. No. 670,417, filed Sept. 25, 1967 now abandoned, which was a division of my copending application Ser. No. 670,419, filed Sept. 25, 1967 now Patent No. 3,455,976.

This invention relates to products of unknown chemical structure prepared by reacting one or more substantially anhydrous borate esters with a chloride of a metal selected from the group consisting of Ti(IV), Zr(IV), Hf(IV), Sn(IV), Al(III), Fe(III), Ga(III), In(III), Mo(V), Nb(V), Ta(V), and W(VI) to form a compound of complex chemical structure and then reacting said complex compound with a silicon-containing compound conforming to the formula $Cl_nSiR_{4-n}$ where $n$ is an integer from 1 to 4 and R is a radical selected from the group consisting of lower alkyl radicals containing from 1 to 8 carbon atoms, and phenyl and tolyl radicals, to form a second compound of complex chemical structure comprising the selected metal, silicon, boron, carbon, hydrogen, chlorine and oxygen.

My above mentioned copending application Ser. No. 470,419, filed Sept. 25, 1967, discloses the preparation of highly useful products of complex chemical structure which are the reaction products of substantially anhydrous trimethyl borate with the substantially anhydrous chloride of a metal selected from the group consisting of Ti(IV), Zr(IV), Hf(IV), Al(III), Fe(III), Mo(V), Nb(V), Sn(IV), Ta(V), and W(VI), and mixtures of such chlorides. While it is preferred to employ trimethyl borate, it may be replaced by other borate esters, such as triethyl borate, tripropyl borate, tributyl borate, trihexyl borate, tripropyl borate, tributyl borate, trihexyl borate, trihexylene glycol biborate, tri-m,p-cresyl borate and mixtures thereof or a mixture of one or more of such borate with trimethyl borate. In my copending application Ser. No. 776,804, filed Nov. 18, 1968 now Patent No. 3,519,664, it is stated that trimethoxy boroxine may also replace trimethyl borate and that $GaCl_3$ and $InCl_3$ are operative metal chlorides.

As disclosed in my copending application Ser. No. 670,419, filed Sept. 25, 1967, in forming these products of unknown complex chemical structure using trimethyl borate, the substantially anhydrous chloride of the selected metal is mixed with substantially anhydrous trimethyl borate in a molar ratio of at least about 0.33 mole of borate ester for each mole of the chloride of the selected metal, preferably, in a substantially anhydrous inert diluent, such as methylene chloride, chloroform, carbon tetrachloride, or an excess of the trimethyl borate. The reactions may be carried out between room temperature and about 120° C. The order of addition of the reagents is not critical. Thus, the metal chloride may be added to the boron ester, or the boron ester may be added to the metal chloride, or both may be added simultaneously to the reaction zone.

In the case of the very reactive combinations of reagents, such as titanium tetrachloride or ferric chloride with trimethyl borate, the reactions start immediately at room temperature and the temperature of the reaction mixture rises slightly with methyl chloride being given off. In the case of less reactive combinations of reagents, it is often necessary to heat the reagents mildly, for example, to the boiling point of methylene chloride (40° C.) or trimethyl borate (67°–68° C.), or in a few cases to temperatures as high as 90°–120° C.

When methyl chloride ceases to be given off the reaction is complete and the desired reaction product may be isolated by evaporation of volatile material, such as the diluent or excess reagent. This may be accomplished by applying a vacuum to the reaction vessel while gently heating. In some cases, the reaction product is highly soluble in the reaction medium, therefore, stronger heating under vacuum is required to remove the volatile material. In general, temperatures not over 100° C. under a final vacuum of 1–20 mm. of mercury are sufficient to remove the volatile material.

The method for reacting the chlorides of the previously mentioned group of metals with other borate esters, such as triethyl borate, tripropyl borate, tributyl borate, trihexyl borate, trihexylene glycol biborate, tri-m, p-cresyl borate, trimethoxy boroxine, and mixtures thereof or a mixture of one or more of such borates with trimethyl borate is similar to that described for the reaction with trimethyl borate. With these borate esters, however, the reactions are, in general, considerably slower and temperatures up to about 200° C. may be used to obtain reasonable reaction rates. Since the boiling points of the organic chloride by-products are considerably higher than methyl chloride, they must be distilled or evaporated from the reaction products by heating the reaction mixture either at atmospheric or reduced pressure.

In addition to the inert diluents previously mentioned these complex reactions may also be carried out in aliphatic hydrocarbons, such as petroleum ether, hexane, heptane, and cyclohexane. However, the reactions proceed much more slowly in these diluents and, therefore, are not preferred.

The composition of the complex reaction products of the borate esters and metal chlorides appear to vary with the molar ratios of the borate esters to metal chloride as indicated by the amount of organic chloride given off. As the molar ratio of borate ester to metal chloride increases, the solubility and the acidity decreases.

These reaction products appear to be polymeric in nature and very complex in chemical structure. While I do not wish to be limited to any theory, there is evidence that one or more metal-oxygen-boron bonds are formed in these reactions leading to materials which in their simplest form may have the following general formula:

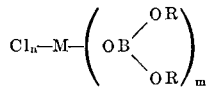

and polymers formed by coordination cross linking thereof, where M represents the metal, $n$ plus $m$ equals the valence of the metal and R is selected from alkyl, aryl or the connecting structure of the boroxine group.

These complex products are soluble to a greater or lesser extent in water giving acidic solutions. When freshly prepared in methylene chloride they are at least slightly soluble in methylene chloride and also in one or more of the solvents chloroform, carbon tetrachloride, acetone, and glycol ethers, such as monomethyl ethylene glycol and dimethyl ethylene glycol ethers. Upon standing or drying, a product is formed which is insoluble in non-polar organic glass and cellulosic fabrics, and the solvent evaporated, marked water repellency develops. The water repellency can be enhanced by washing in a 1 percent solution of soap, rinsing and drying.

When reacting a mixture of chlorides of selected metals with a borate ester, at least about 0.33 mole of the selected borate is used for each sum of the molar proportions of the chlorides of the selected metals totaling one mole.

When producing a complex product prepared by the reaction of the chlorides of at least two selected metals with a borate ester, it is often preferable to react one of the metal chlorides with the borate completely as previously described but without isolating the complex reaction product. The chloride of another selected metal, in a molar quantity not greater than the molar quantity of the chloride of the first selected metal, then may be added to the reaction liquor and be reacted with the previously formed complex reaction product at a temperature between room temperature and about 200° C. After the second reaction has been completed, as indicated when organic chloride ceases to be given off, volatile material is removed by evaporation to isolate the second complex reaction product. This method is particularly advantageous when it is desired to react a very reactive metal chloride, such as titanium tetrachloride or ferric chloride, and a less reactive metal chloride with a borate ester. This method also makes possible the reaction of a borate ester with one or more of the chlorides of the metals of the group previously mentioned together with the chloride of a metal which alone does not react with a borate ester, such as silicon tetrachloride. I have now discovered that this method also makes possible the reaction of a borate ester with one or more chlorides of the metals previously mentioned to form a compound of complex chemical structure and that the complex compound may be reacted with a silicon compound conforming to the formula $Cl_nSiR_{4-n}$ where $n$ is an integer from 1 to 4 and R is a radical selected from the group consisting of alkyl radicals containing from 1 to 8 carbon atoms, and phenyl and tolyl radicals. As illustrative of such compounds I may mention silicon tetrachloride, alkyl-trichlorosilanes, phenyltrichlorosilane, tolyltrichlorosilane, diphenyldichlorosilane, ditolyldichlorosilane, triphenylchlorosilane, and tritolylchlorosilane.

While I do not wish to be limited to any theory, there is evidence that the reaction products mentioned in the last previous paragraph may be polymers which are cross linked by coordination and which contain a plurality of linkages as represented by the following formula

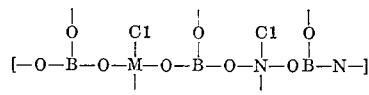

where M and N are different metals and the number of bonds shown correspond to the selected metals.

These complex products prepared with trimethyl borate and the chlorides of two or more metals still contain unreacted chlorine atoms which are reactive toward many organic compounds which contain a reactive hydrogen atom, such as amino, hydroxyl, or acrboxyl groups. They may also react with further amounts of trimethyl borate if reactive chlorine atoms remain on the metal. The reaction product of aluminum trichloride, methyl borate and silicon tetrachloride exhibits a pinkish white fluorescence when irradiated with ultra violet of 3650 A. The products of the invention are slighly soluble in methylene chloride and most are soluble to some extent in highly polar solvents, such as alcohol.

The invention is illustrated further by the following specific examples:

EXAMPLE 1

This experiment was carried out in equipment comprising a stirred reaction flask which was fitted with an addition funnel, thermometer and reflux condenser. The reflux condenser in turn was connected to an empty safety trap, then to a water scrubber and then to a gas meter. 55 grams of titanium tetrachloride (0.5 mole) was first reacted with 104 grams of trimethyl borate (1 mole) in 200 grams of methylene chloride. The reaction proceeded rapidly at 26°–44° C. About 1 mole of methyl chloride was given off indicating that about two of the chlorine atoms in the $TiCl_4$ had reacted with the trimethyl borate to release $CH_3Cl$. When the reaction was completed, 42 grams of $SiCl_4$ (0.25 mole) was added over a period of about 30 minutes. An immediate reaction occurred and methyl chloride was given off. This reaction was continued for about 5 hours and about 0.8 mole of methyl chloride was given off. When the $SiCl_4$ was first added to the clear amber solution of the reaction of $TiCl_4$ and trimethyl borate, yellow solids were formed which dissolved as the reaction progressed. An additional 200 grams of $CH_3Cl$ was added to the reaction mixture at the end of the reaction. Almost all of the solids dissolved. The methylene chloride was removed from the product by vacuum evaporation. There was recovered about 157 grams of yellow solids which rapidly dissolved in water with effervescence and evolution of heat. The yellow solids softened and became rubbery over a temperature range of about 70°–100° C. As the temperature was raised over 100° C., volatile material was evolved and the solids turned white and became much less soluble in water.

Elemental analysis of the product showed: Ti, 15.6%; Si, 3.3%; Cl, 27.5%; B, 8.2%; C, 7.2% H, 2.7% O (by difference), 25.5%.

A 1% aqueous solution of this product was applied to glass fabric and dried. A marked delustering occurred. Then the fabric was washed in a 1% aqueous solution, rinsed and dried. Excellent water repellency developed.

EXAMPLE 2

Sixty-seven grams (0.5 mole) of dry, ground $AlCl_3$ was suspended in 400 g. of dry $CH_2Cl_2$ in a 1-liter flask, To this was added 104 grams (1 mole) of methyl borate over a period of about 25 minutes. The reaction mixture was heated for about another 3 hours. About 0.75 mole of methyl chloride was evolved. Then 84 grams of SiCl₄ was added to the flask with stirring over a period of about 30 minutes. The reaction mixture was heated to 40°–42° C. for about 28 hours. Another 0.75 mole of methyl chloride was evolved. The product was a white finely divided solid which was isolated by filtering from the methylene chloride and drying at about 75° C. in a vacuum oven. Total recovery was about 115 g. of white solids.

A 1% aqueous solution of this product was very substantive to glass fabric. A dip of the fabric in 1% solution followed by a squeeze through rolls to give about 100% wet pick up, then ironed dry gave a fabric which was permanently stiffened in a way that starch stiffens cotton fabric. This stiffening resisted washing out even in soap solutions. When rinsed in a soap solution, outstanding water repellency developed.

EXAMPLE 3

0.5 moles of FeCl₃ dissolved and suspended in 200 grams of methylene chloride was reacted with 1 mole of B(OCH₃)₃ at 25°–42° C. over a period of 1 hour and 40 minutes. About 0.5 mole of SiCl₄ was added over a period of 20 minutes. Methyl chloride was slowly evolved and continued to be evolved over a period of 16 hours. When the reaction was complete the product was isolated by vacuum evaporation of the liquid products leaving a yellow-brown solid. Analysis showed Fe=19.3%; Si=3.3%; B=3.8%; Cl=29.1%. The ratio of Fe to Si was 3 to 1 and the ratio of B to Cl was 3+ to 7.

EXAMPLE 4

46.5 grams (solid basis) of the reaction product of 1 mole of TiCl₄ and 2 moles of methyl borate which was still dissolved in methylene chloride at 53% concentration was used in this experiment to react further with diphenyldichlorosilane. The quantity mentioned above is equivalent to 0.125 atom of Ti. 31.7 grams (0.125 mole) of diphenyldichlorosilane was added and the mixture heated to 45°–52° C. for 16 hours. Over ⅛ mole of methyl chloride was given off and a homogeneous yellow solution was obtained. Vacuum evaporation of the solvent left a friable yellow solid which had the following analysis: Ti=9.2%; Si=5.5%; Cl=15.6%; B=3.4%. The molar ratio of Ti to Si was 1 to 1 and the molar ratio of Cl to B was 2.3 to 1.6. This analysis indicates a possible structure:

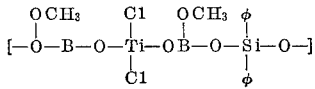

This product hydrolyzes in water to form gummy polymeric solids which are useful in water repellent caulking compositions.

EXAMPLE 5

As in previous examples, 95 grams (0.5 mole) of TiCl₄ was reacted with 114 grams (1.0 mole) of B(OCH₃)₃ in 200 grams methylene chloride. When the reaction was completed, as evidenced by no further evolution of methyl chloride, 126.8 grams (0.5 mole) of diphenyldichlorosilane was added over a period of a few hours. Methyl chloride was slowly evolved. The reaction mixture was refluxed for 24 hours. At the end of this period evolution of methyl chloride had ceased. The yellow solid product was isolated by vacuum evaporation of the methylene chloride. It was analyzed and found to contain Ti=10.9%; Si=3.5%; B=2.4%; Cl=14.5%. This analysis indicates a possible structure:

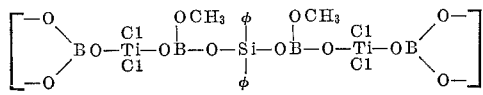

This material also reacts with water to form gums that dry to hard water repellent solids and are useful in caulking and sealing compositions.

EXAMPLE 6

One molar part of TiCl₄ was reacted completely with two molar parts of B(OCH₃)₃ in methylene chloride. When completed a yellow solution remained which contained 53% solids of which 17.2% was Ti. This product is believed to be essentially:

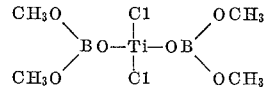

88 grams of this solution which is equivalent to 0.125 mole of the above described product was placed in a stirred reaction flask. Then, 17 grams of dimethyldichlorosilane (0.125 mole) was added to the flask from a dropping funnel. The reaction mixture was refluxed for 18 hours. There was evolved about 0.12 mole of methyl chloride. A clear homogeneous solution of the reaction product remained. When the solvent was removed by vacuum evaporation there remained 43.1 grams of yellow solid product which contained Ti, B, Si, O, C and H. This material reacted with a small amount of water to give gummy grease-like products which were very water repellent.

In a similar experiment trimethylchlorosilane was found to react also to evolve methyl chloride and gave a product which contained Ti, Si, B, Cl, OCH₃, C, H, and O.

In my copending application Ser. No. 786,447 filed Dec. 23, 1968, I have claimed methods for producing compounds of unknown complex chemical structure by reacting borate esters such as trimethyl borate, triethyl borate, tripropyl borate, tributyl borate, trihexyl borate, trihexylene glycol biborate, tri-m,p-cresyl borate and trimethoxyboroxine with a first chloride of a metal selected from the group consisting of Ti(IV), Zr(IV), Hf(IV), Sn(IV), Al(III), Fe(III), Ga(III), In(III), Mo(V), Nb(V), Ta(V), and W(VI) in an inert diluent until an organic chloride ceases to be given off thereby forming a liquor comprising said diluent and a compound of unknown complex chemical structure. Then, a second chloride of a metal selected from said group is added to said liquor and is permitted to react with said complex compound until an organic chloride ceases to be given off to form a second liquor comprising said diluent and a second compound of unknown complex chemical structure.

I claim:
1. The method which comprises mixing at least one substantially anhydrous borate ester selected from the group consisting of trimethyl borate, triethyl borate, tripropyl borate, tributyl borate, trihexyl borate, trihexylene glycol biborate, tri-m, p-cresyl borate, and trimethoxyboroxine with a substantially anhydrous chloride of a metal selected from the group consisting of Ti(IV), Zr(IV), Hf(IV), Sn(IV), Al(III), Fe(III), Ga(III), In(III), Mo(V), Nb(V), Ta(V) and W(VI) in a molar ratio of at least 0.33 mole of the selected borate for each mole of the chloride of the selected metal in an inert substantially anhydrous diluent, permitting the chloride of the selected metal to react with the selected borate at a temperature between room temperature and about 200° C. until the reaction mixture ceases to give off organic chloride thereby forming a liquor comprising said diluent and a compound of complex chemical structure comprising the selected metal, boron, carbon, hydrogen, chlorine, and oxygen, mixing with said liquor a substantially anhydrous silicon compound conforming to the formula Cl$_n$SiR$_{4-n}$ where $n$ is an integer from 1 to 4 and R is a radical selected from the group consisting of alkyl radicals containing from 1 to 8 carbon atoms, and phenyl and tolyl radicals, and permitting the silicon compound to react with said compound of complex chemical structure at a temperature between room temperature and about 200° C.

until the reaction mixture ceases to give off an organic chloride thereby forming a second liquor comprising said diluent and a second compound of complex chemical structure comprising said selected metal, silicon, boron, carbon, hydrogen, chlorine, and oxygen, the molar quantity of said silicon compound being not greater than the molar quantity of the chloride of said selected metal.

2. The method as claimed by claim 1 wherein the diluent is selected from the group consisting of the selected borate ester, methylene chloride, chloroform, and carbon tetrachloride.

3. The compound of complex chemical structure produced by the method claimed by claim 1 after removal of volatile material from said second liquor.

4. The method which comprises mixing a substantially anhydrous trimethyl borate with a substantially anhydrous chloride of a metal selected from the group consisting of Ti(IV), Zr(IV), Hf(IV), Sn(IV), Al(III), Fe(III), Ga(III), In(III), Mo(V), Nb(V), Ta(V), and W(VI) in a molar ratio of at least 0.33 mole of trimethyl borate for each mole of the chloride of the selected metal in an inert substantially anhydrous diluent, permitting the chloride of the selected metal to react with the trimethyl borate at a temperature between room temperature and about 120° C. until the reaction mixture ceases to give off methyl chloride thereby forming a liquor comprising said diluent and a compound of complex chemical structure comprising the selected metal, boron, carbon, hydrogen, chlorine, and oxygen, mixing with said liquor a substantially anhydrous silicon compound conforming to the formula $Cl_nSiR_{4-n}$ where $n$ is an integer from 1 to 4 and R is a radical selected from the group consisting of alkyl radicals containing from 1 to 8 carbon atoms, and phenyl and tolyl radicals, and permitting the silicon compound to react with said compound of complex chemical structure at a temperature between room temperature and about 120° C. until the reaction mixture ceases to give off methyl chloride thereby forming a second liquor comprising said diluent and a second compound of complex chemical structure comprising said selected metal, silicon, boron, carbon, hydrogen, chlorine, and oxygen, the molar quantity of said silicon compound being not greater than the molar quantity of the chloride of the selected metal.

5. The method as claimed by claim 4 wherein the diluent is selected from the group consisting of trimethyl borate, methylene chloride, chloroform, and carbon tetrachloride.

6. The compound of complex chemical structure produced by the method claimed by claim 4 after removal of volatile material from said second liquor.

7. The method as claimed by claim 4 wherein the chloride of the selected metal is titanium tetrachloride.

8. The method as claimed by claim 4 wherein the chloride of the selected metal is ferric chloride.

9. The method as claimed by claim 4 wherein said silicon compound is silicon tetrachloride.

10. The method as claimed by claim 4 wherein said silicon compound is diphenyldichlorosilane.

11. The method as claimed by claim 4 wherein said silicon compound is dimethyldichlorosilane.

12. The method as claimed by claim 4 wherein said silicon compound is methylthrichlorosilane.

13. The method as claimed by claim 4 wherein said silicon compound is phenyltrichlorosilane.

14. The compound of complex chemical structure produced by the method claimed by claim 7 after removal of volatile material from said second liquor.

15. The compound of complex chemical structure produced by the method claimed by claim 8 after removal of volatile material from said second liquor.

16. The compound of complex chemical structure produced by the method claimed by claim 9 after removal of volatile material from said second liquor.

17. The compound of complex chemical structure produced by the method claimed by claim 10 after removal of volatile material from said second liquor.

18. The compound of complex chemical structure produced by the method claimed by claim 11 after removal of volatile material from said second liquor.

19. The compound of complex chemical structure produced by the method claimed by claim 12 after removal of volatile material from said second liquor.

20. The compound of complex chemical structure produced by the method claimed by claim 13.

References Cited
UNITED STATES PATENTS 2,312,208  2/1943  Clayton et al. _____ 260—429
2,346,155  4/1944  Denison et al. _____ 260—429

TOBIAS E. LEVOW, Primary Examiner

A. P. DEMERS, Assistant Examiner

U.S. Cl. X.R.

106—2; 117—72, 124, 135.5, 138.8, 144.5; 252—8.6, 301.2; 260—2, 46.5, 429.3, 429.5, 429.7, 448R, 439R